Patented Mar. 18, 1930

1,751,298

UNITED STATES PATENT OFFICE

BERNARD H. VARNAU AND TRUMAN B. WAYNE, OF SUGAR LAND, TEXAS

ULTRAFINE, SOFT, GRANULATED SUCROSE SUGAR

No Drawing.   Application filed July 23, 1927. Serial No. 208,049.

This invention relates to sucrose sugar and more particularly to ultra fine, soft, granulated sucrose sugar of substantially absolute purity.

The principal object of this invention is to provide substantially pure granulated sucrose sugar the individual crystals of which are finer and softer than the finest high grade granulated sugar hitherto produced.

Another object of this invention is to provide substantially pure granulated sucrose sugar which is free running and relatively non-hygroscopic and which consists of ultra fine, regular, soft crystals.

With the increasing demand for very fine sucrose sugar various attempts have been made to prepare ultra fine sugar on a commercial scale. However, these attempts although successful in producing a somewhat superior grade of sugar than that hitherto produced have not been wholly successful because of the limitations of the processes by which the sugars have been prepared. These processes may be roughly divided into four classes of which the products are: (a) pan boiled granulated sugar, (b) commercial soft sugar, (c) pulverized sugar, and (d) the so-called C. P. sucrose.

In the preparation of pan boiled granulated sugar high purity syrups are boiled to grain under partial vacuum in vacuum pans and the grain is formed and nourished in solutions of relatively high density. The sugar is then spun off from the mother liquor, washed and granulated (dried). In response to the trade demands for finer grain sugars the pan boilers have been able to produce somewhat finer crystals by more careful attention to the regulation of conditions in the vacuum pan. However, because of the temperatures and concentrations employed in vacuum pan processes it has been impossible to obtain exceedingly fine crystals which can be purged cleanly from adhering syrup and washed sufficiently clean to permit drying in the granulators.

In order to produce a finer sugar by the vacuum pan process the granulated sugar produced by such process has been screened and the finer crystals marketed. However, this method does not produce materially finer crystals and is commercially uneconomical. Moreover, the crystals obtained are relatively hard, corresponding to the hard large granulated crystals from which they were screened.

As an after-product of granulated sugars commercial soft sugars have been prepared by boiling low purity syrups and leaving a part of the molasses of the massecuite adhering to the crystals to give them the soft "wooly" feeling which is desired in these sugars. Commercial soft sugars are not intended for uses similar to those for which the hard granulated sugars of commerce are employed because of their lower purity. However, our new sugar hereinafter described has the soft texture of the low purity soft sugars without having any molasses film adhering thereto, is capable of being dried until moisture free, and has the high purity of the commercial hard granulated sugars without the larger hard crystals of the latter.

Realizing the obstacles in the way of producing fine crystals by the vacuum pan and screening process and desiring to obtain a readily soluble sugar, sugar producers have resorted to the disintegration of granulated sugar by grinding it in suitable mills. While a soft sugar is thus produced it is not a granulated sugar but consists of fragments of crystals from which it was prepared and unless ground to an impalpable powder is gritty. Moreover, it is highly hygroscopic and cakes readily. To overcome these latter disadvantages it has been necessary to mix approximately three or four per cent of corn starch with the sugar. While such sugar is suitable for some purposes it falls short in many respects from supplying the demand for an ultra fine, soft granulated sugar.

While not prepared on a commercial scale C. P. sucrose has been manufactured for laboratory work by precipitating fine crystals of sucrose from an alcoholic solution. Aside from the great expense involved in this process which renders it commercially impractical, the sugar formed does not have the desired characteristics demanded by the trade. Although comparatively fine it is relatively hard and rough and consists of aggregates of fine crystals rather than individual crystals. Moreover, it is chalky or dead-white in appearance and lacks the brilliance and luster demanded. The crystal formation of C. P. sucrose is relatively irregular and this sugar has a tendency to form crystal aggregates. Moreover, it is hygroscopic to a substantial degree.

In endeavoring to supply the demand for an ultra fine granulated sugar we have discovered that by proceeding in a manner contrary to the prior teachings of the art we are able to overcome to a very marked degree the disadvantages enumerated. Instead of employing the relatively high densities and temperatures used in the usual crystallization process we have discovered that by rapidly cooling a sucrose solution of a density and temperature corresponding to those at which syrup is discharged from the centrifugals in the usual crystallization processes a substantially instantaneous, complete, and regular grain setting is effected. Moreover, the concentration of the mother liquor is so reduced that formation of subsequent crops of false grain is prevented. Upon crystallizing such a magma in a crystallizer a massecuite is produced from which ultra fine, soft crystals may be readily and cleanly purged substantially free from any film of adhering syrup. These crystals need but little washing to remove the minor amounts of impurities present and are in condition for granulation by the usual methods.

In the preferred practice of producing this ultra fine, soft sugar a sucrose solution either of cane or beet origin having a density of approximately from 75 to 85 per cent solids by weight at 17.5° C., and preferably containing 80 to 82 per cent solids obtained by melting commercial sugars of sufficient purity, or by concentrating in vacuo high purity white liquors from refinery char filters, or by diverting high purity granulated syrups from previous hard granulated strikes from the usual refining process, is passed through a heater and raised to a temperature between 140° and 212° F., and preferably to a temperature of 160° F. to melt false grain, or if substantially grain-free may be passed directly to a suitable cooling vessel. The solution is then rapidly cooled in any suitable apparatus and preferably by spraying the solution through an air chamber at atmospheric pressure against a cooling surface or jacket, to approximately from 95 to 130° F. and preferably from 110° to 120° F. The exact amount of cooling to obtain the best results is governed by the density, purity, and temperature of the liquor or syrup being treated and the size of the crystals desired. This rapid cooling causes a substantially instantaneous, complete, and regular grain setting. The solution is then discharged into any suitable crystallizing apparatus in which it is slowly agitated for a period of from one-half to six hours preferably for about two hours while the temperature of the mass is slowly reduced to approximately from 80° to 90° F. It is then spun in a centrifugal to free the crystals from the mother liquor and carefully washed with a fine spray of water or low pressure steam to further purify the crystals after which the crystals are conveyed to horizontal driers of conventional structure where they are dried substantially absolutely free from moisture. The mother liquor thrown out of the centrifugal machine may be retreated for the preparation of a second crop of crystals.

By starting with a hot super-saturated syrup of 75 to 85 per cent solids, preferably 80 to 82 per cent solids to facilitate spinning of the magma later, and crystallizing the sugar by cooling, an immediate grain setting may be obtained in sufficient number to prevent the formation of false grain later. Or, should some false grain form they will grow rapidly to a size which permits ready centrifuging. Since the magma is allowed to crystallize until the temperature is reduced to room temperature or below, the syrup around the grain has given up its sugar content to the extent that it will not crystallize further at the temperatures to which the finished massecuite is subjected in spinning. This eliminates the trouble mentioned above due to false grain formation in centrifuging the massecuite and the massecuite may be centrifuged at room temperature when convenient. The grain has been grown and nourished in a cool medium and the adhering syrup is no longer super-saturated; therefore, the objections to attempts to produce such sugar by other processes is eliminated. The cool massecuite spins readily because of its even regular crystals, the absence of subsequently formed false grain, and the light mother liquor on the crystals. In direct contradistinction to the difficultly purgeable soft sugar massecuites of lower purity the massecuites made by our process spin with surprising rapidity and facility and very little wash water or low pressure steam is required to wash the sugar to nearly absolute purity. In fact, we have found that such sugars can be discharged from the centrifugals in a state permitting granulation even though no wash water is used on the sugar. While this is not our preferred practice, it illustrates the free purging qualities of this new type of sugar.

The sugar produced by this process is of substantially absolute purity, containing approximately from 99.5 to 100 per cent sucrose by weight. It is many times finer than the finest granulated sugar hitherto produced, the individual crystals being fine enough to pass for the major part through a 35 to 40 mesh screen. The crystals are relatively soft and unlike commercial soft sugars are substantially free from any adhering film of syrup. The crystals themselves are substantially uniform and are of the monoclinic system. There is substantially no tendency of the sugar to form crystal aggregates and substantially no microscopic crystals adhere to the individual crystal as in the case of various other types of sugars. Our sugar is free running, substantially non-hygroscopic and has substantially no tendency to form lumps. The sugar produced by our process is very soft in texture is clear white, and has a high brilliancy luster. Moreover, because of its extreme fineness, purity, and freedom from adhering mother liquor it is very readily soluble.

The sugar produced by our process is equally useful as a table sugar and for other uses to which hard granulated sugars are put and is also useful where the present pulverized sugars are employed. It has distinct advantages over hard granulated sugars because of its soft texture and ready solubility and will find application for many uses where pulverized sugars are objectionable because of their caking tendency.

In addition to the advantageous features hereinbefore set forth our sugar has the added advantage that it may be prepared relatively cheaply since the high grade syrups discharged from the centrifugals in other crystallization processes may be employed in our process without any substantial preliminary treatment since the conditions of density and temperature at which these syrups are discharged are suitable for use in the practice of our process.

Sugar of the character described herein can advantageously be prepared by the practice of the processes forming the subject matter of our Patent Number 1,715,049 and copending application Serial Number 133,595, filed September 4th, 1926.

By the term "ultra fine sugar" as employed in the specification and claims is meant a sugar, the individual crystals of which are sufficiently fine to pass for the major part through a 35 to 40 mesh screen.

While we have described in detail the preferred embodiment of our invention it is to be understood that the details of procedure by which our product is prepared may be widely varied without departing from the spirit of the invention or the scope of the subjoined claims.

We claim:

1. Granulated sucrose sugar consisting of ultra fine, soft, substantially uniform crystals substantially free from adhering syrup.

2. Granulated sucrose sugar of substantially absolute purity consisting of substantially uniform, fine, soft crystals substantially free from syrup and moisture.

3. Granulated sucrose sugar of substantially absolute purity consisting of separate, relatively uniform, soft crystals of normal crystalline form substantially free from mother liquor.

4. Granulated sucrose sugar which is relatively free-running and non-caking consisting of soft crystals substantially free from hard crystals and mother liquor.

5. Granulated sucrose sugar of a purity of approximately 99.5 to 100 per cent purity consisting of ultra fine, soft crystals of relatively uniform crystal formation.

6. Granulated sucrose sugar consisting of soft, substantially uniform crystals of a fineness to pass a 35 to 40 mesh screen.

7. Granulated sucrose sugar which is relatively free-running and non-caking, which has a high brilliancy and luster, and which consists of substantially uniform, soft crystals of a fineness to pass a 35 to 40 mesh screen.

In testimony whereof we affix our signatures.

BERNARD H. VARNAU.
TRUMAN B. WAYNE.